United States Patent [19]
Ritchey

[11] Patent Number: 6,007,547
[45] Date of Patent: Dec. 28, 1999

[54] APPARATUS FOR AND METHOD OF INSTALLATION OF EAR TAGS

[76] Inventor: Eugene B. Ritchey, 13821 Sable Blvd., Brighton, Colo. 80601

[21] Appl. No.: 08/957,180

[22] Filed: Oct. 24, 1997

[51] Int. Cl.[6] .................................................. A61B 17/00
[52] U.S. Cl. ............................. 606/117; 606/116; 40/301
[58] Field of Search .................................. 606/116, 117; 40/300–302

[56] References Cited

U.S. PATENT DOCUMENTS

| Re. 31,940 | 7/1985 | Ritchey | 119/156 |
|---|---|---|---|
| D. 241,558 | 9/1976 | Schwindt et al. | |
| 3,552,051 | 1/1971 | Ritchey | 40/301 |
| 3,850,360 | 11/1974 | Ritchey | 227/67 |
| 3,867,777 | 2/1975 | Potter | 40/301 |
| 3,900,925 | 8/1975 | La Torraca | 24/90 |
| 3,916,904 | 11/1975 | Ritchey | 128/330 |
| 4,000,744 | 1/1977 | Ritchey . | |
| 4,195,635 | 4/1980 | Ritchey . | |
| 4,281,657 | 8/1981 | Ritchey . | |
| 4,368,735 | 1/1983 | Filmer . | |
| 4,402,320 | 9/1983 | Filmer . | |
| 4,552,147 | 11/1985 | Gardner . | |
| 4,819,639 | 4/1989 | Gardner . | |
| 5,228,224 | 7/1993 | Gardner | 40/301 |
| 5,462,554 | 10/1995 | Gardner | 606/117 |
| 5,588,575 | 12/1996 | Davignon | 227/67 |

FOREIGN PATENT DOCUMENTS

| 2170320 | 8/1996 | Canada . |
|---|---|---|
| 0 004 221A3 | 10/1979 | European Pat. Off. . |
| 2125343A | 3/1984 | United Kingdom . |

Primary Examiner—Glenn K. Dawson
Attorney, Agent, or Firm—Fields and Johnson, P.C.

[57] ABSTRACT

Apparatuses for and methods of installing ear tags are provided. One embodiment of the invention is defined as an ear tag installation tool and which makes use of a pair of handle members which control the insertion of an inserting member through an opening formed in the ear of an animal. The inserting member has attached to it a portion of the ear tag during the insertion process. The inserting member is disposable and separates from the handle members after the insertion process is complete. In a second embodiment, the ear tag installation tool is an elongate tool having a handle and a distal tip for receiving the inserting member. In a third embodiment of the invention, an ear tag installer is provided which has some elements directly attached to the ear tag. The ear tag installer also includes a driving tool which forces the inserting member through the ear. In this third embodiment, the ear tag installation tools of the first and second embodiments can be used as preferred forms of the driving tool. In yet another embodiment of the invention, the elements of the third embodiment attached to the ear tag can be separately defined as a modified ear tag with inherent installation capability.

37 Claims, 4 Drawing Sheets

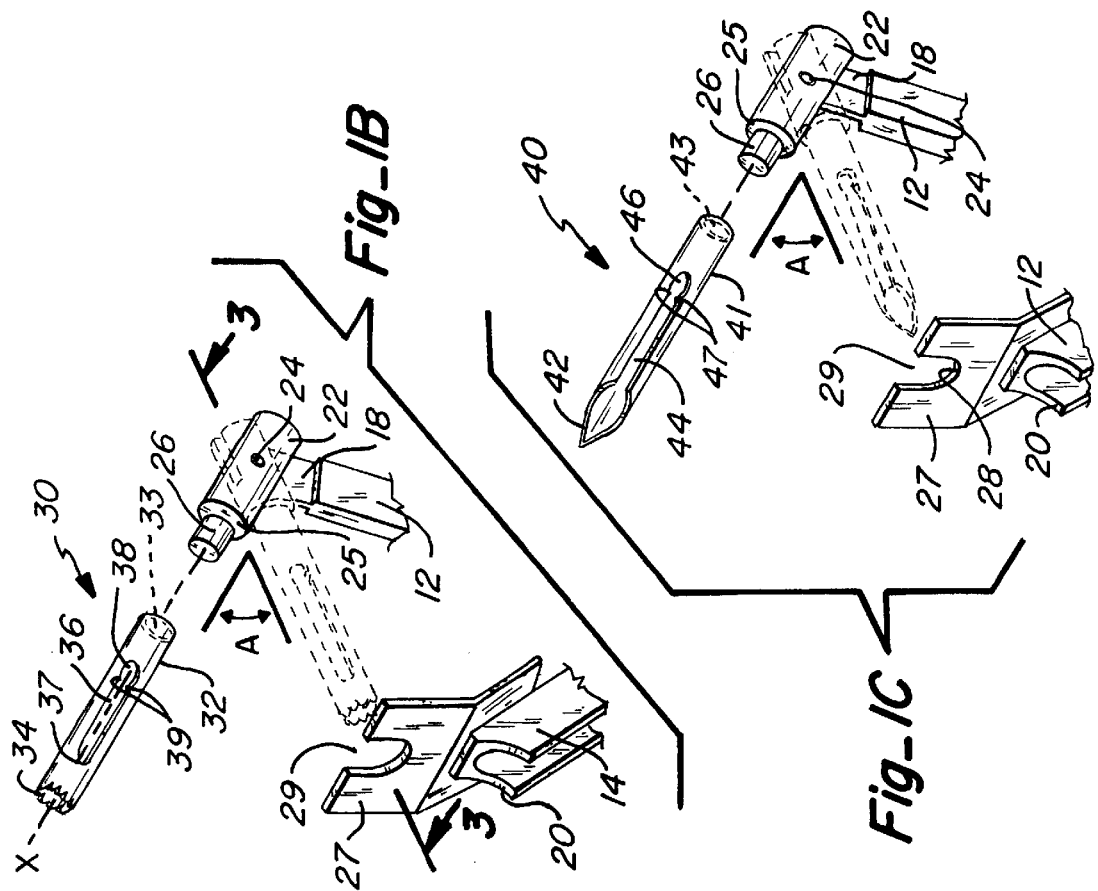
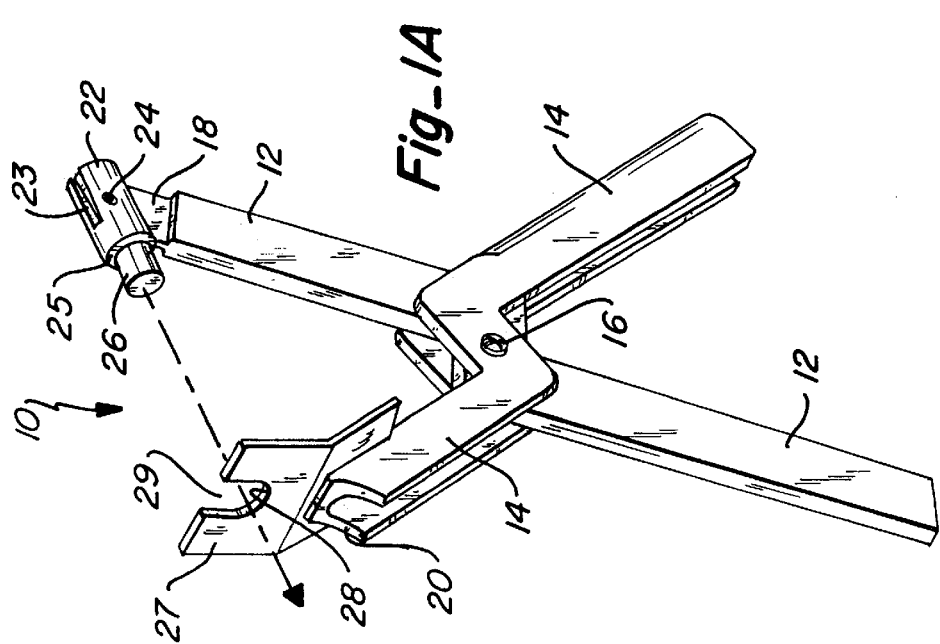

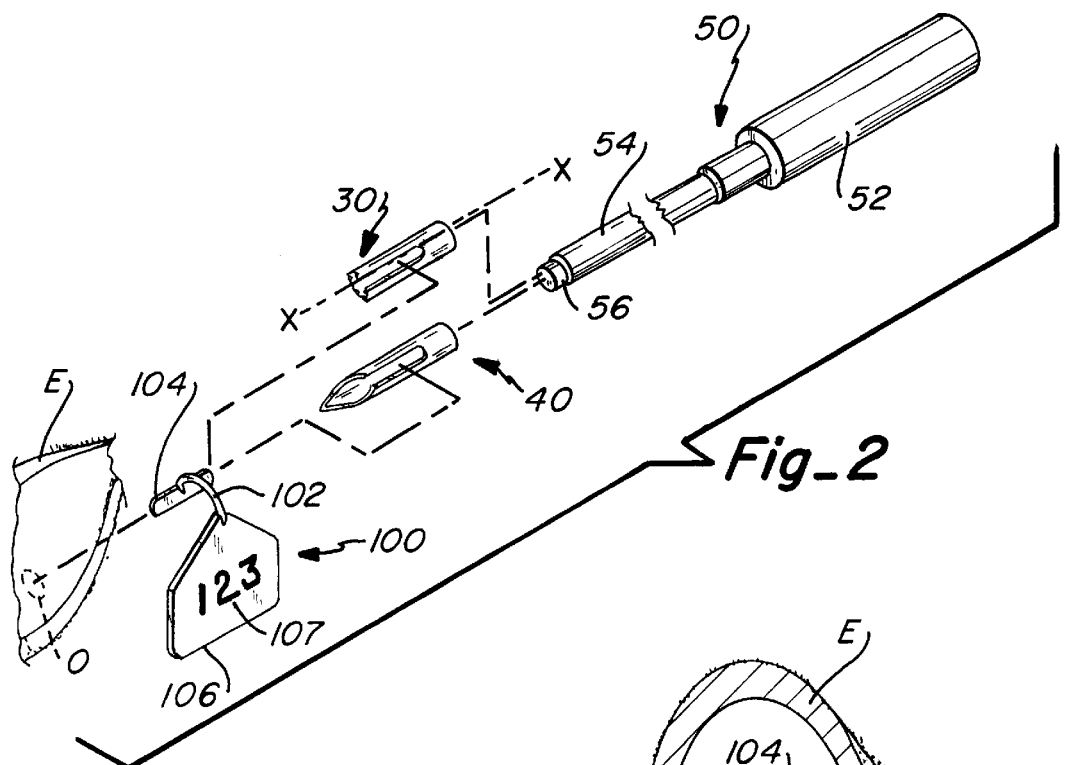
Fig_2
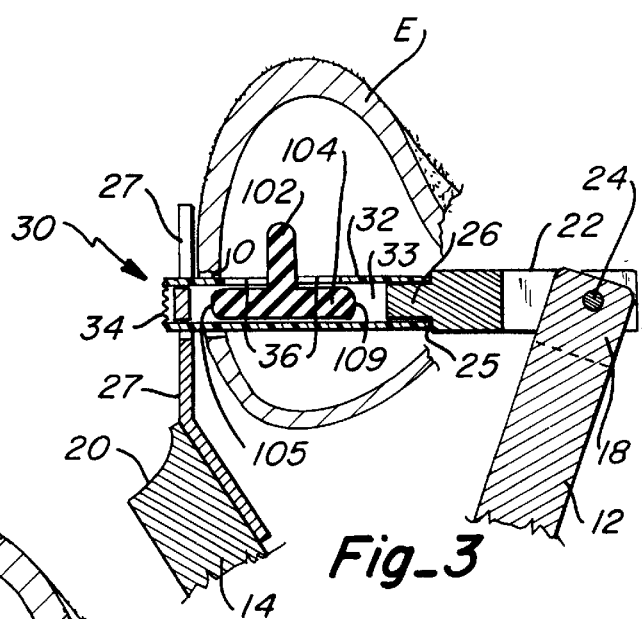
Fig_3
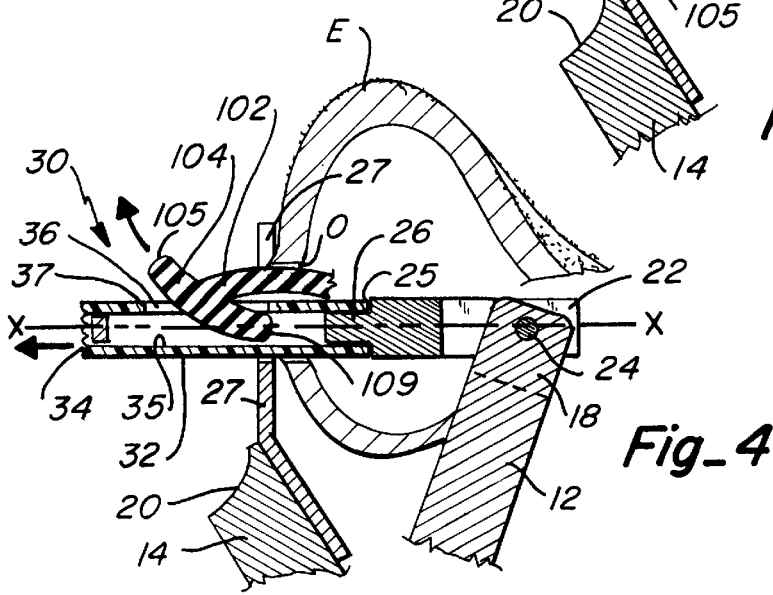
Fig_4

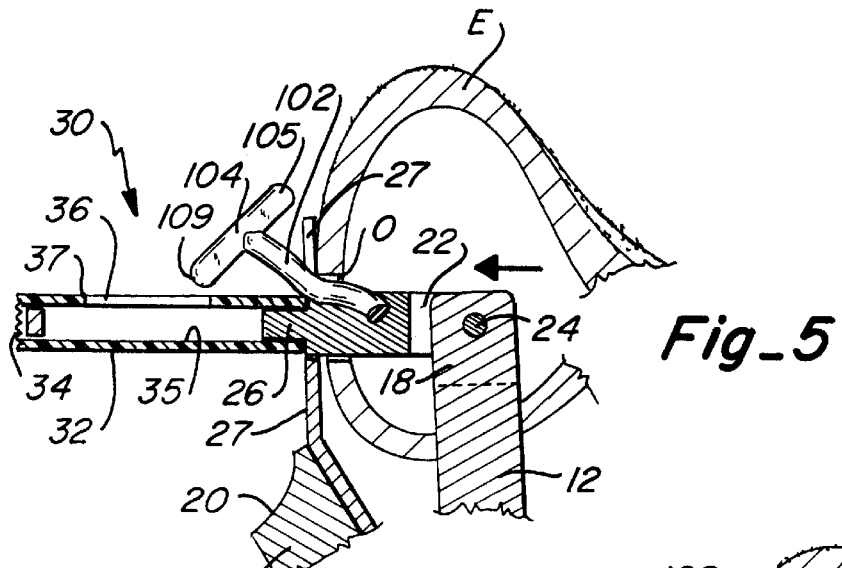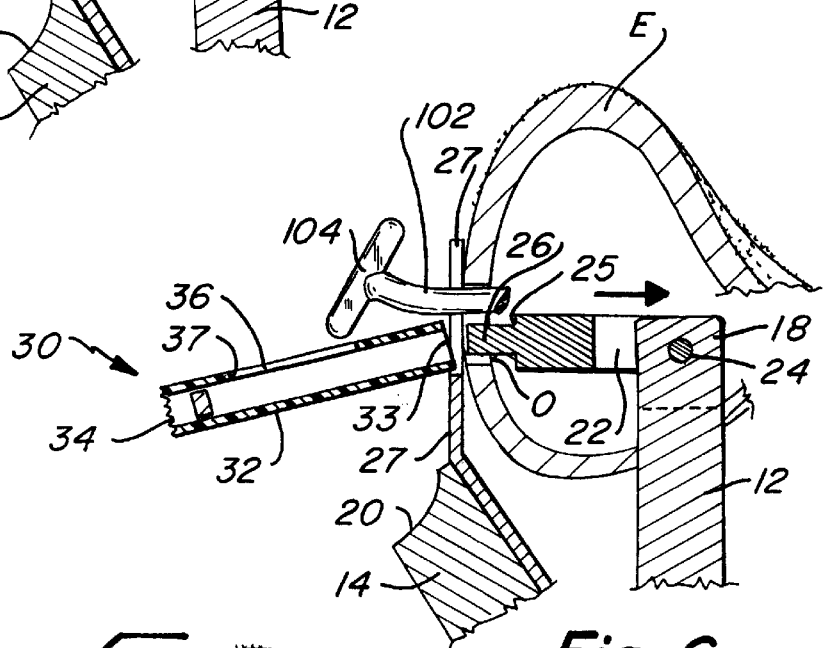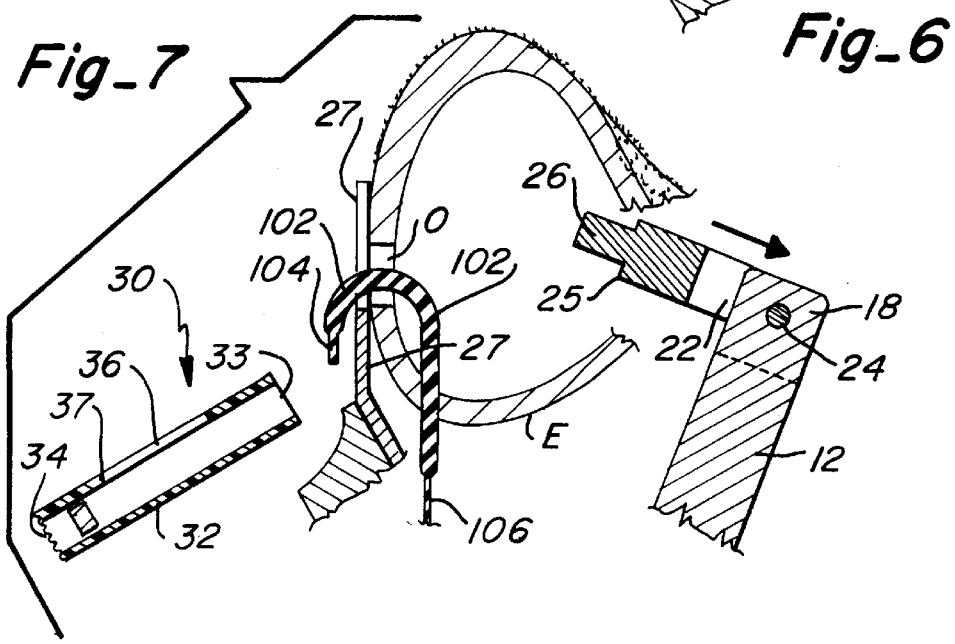

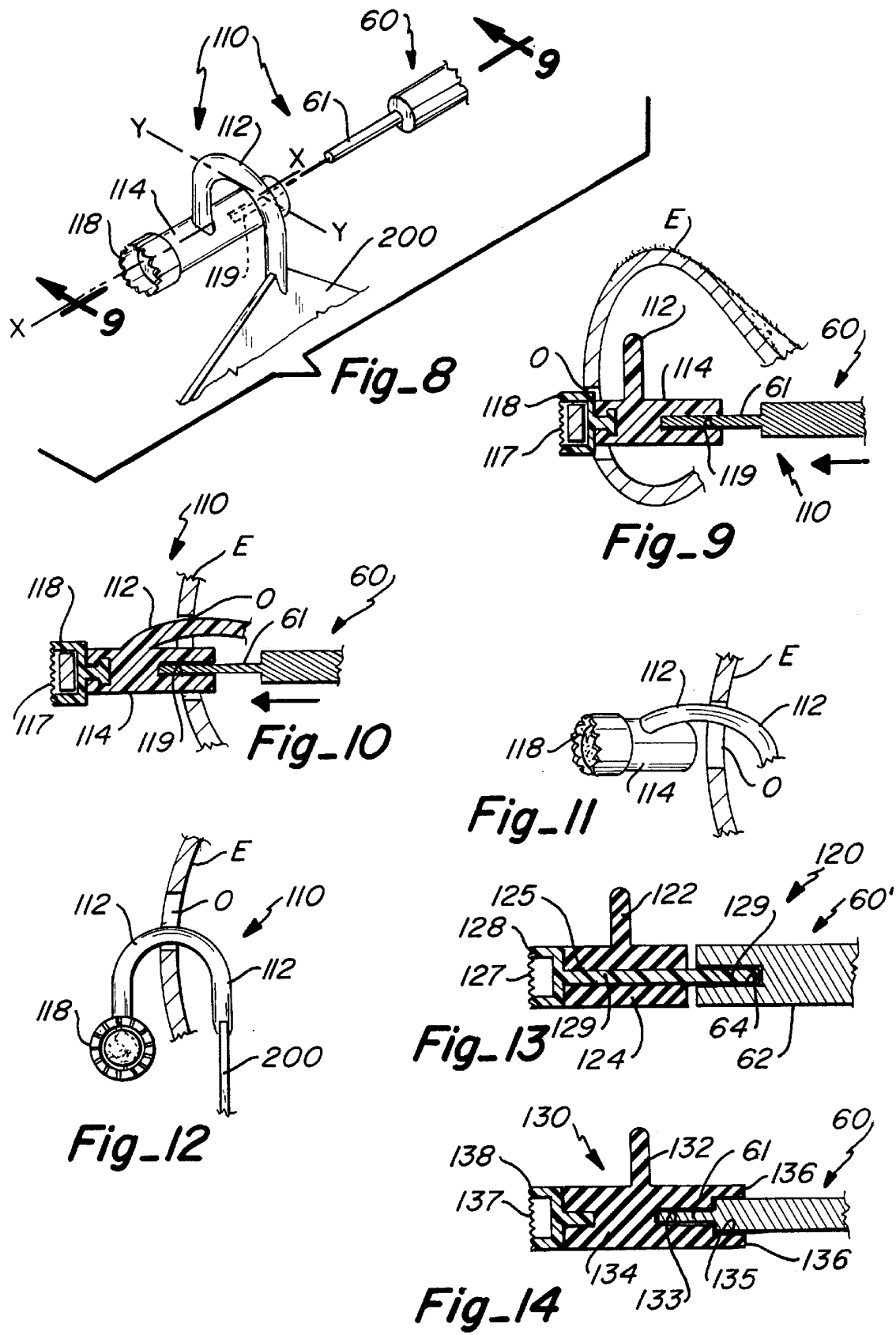

APPARATUS FOR AND METHOD OF INSTALLATION OF EAR TAGS

TECHNICAL FIELD

This invention relates to apparatuses for and methods of installing ear tags and, more particularly, to ear tag installation tools or installers which are used to attach tags to animals such as livestock.

BACKGROUND ART

A number of prior art devices exist which are used to install ear tags on animals such as livestock. One major consideration addressed by many of such devices is to provide an easy and efficient means by which a tag can be installed with minimal damage to the animal's ear. Another primary consideration previously addressed is to provide an ear tag that will remain securely fastened to the animal's ear and be placed in such a position that the indicia on the ear tag can be easily viewed. Yet another major consideration addressed is to provide structurally simple installation tools.

One group of prior art references disclosing ear tag applicators that address one or more of the preceding considerations are a number of U.S. patents to Gardner. Specifically, U.S. Pat. No. 4,819,639 discloses an ear tag applicator comprising two pivotally connected handle members which are moved between an open and closed position to install an ear tag. One of the members includes a pivotal bar which has an ear tag mounted thereto. The other handle member stabilizes the ear and enables the ear tag to be placed through the ear by closing the handle members. U.S. Pat. Nos. 4,552,147 and 5,462,554 also disclose tag applicators having pivotally connected handle members and a pivotal bar for mounting the ear tag. U.S. Pat. No. 5,228,224 to Gardner further discloses one example of an ear tag which may be installed by one or more of the previous Gardner patents.

U.S. Pat. No. 4,368,735 to Filmer is another example of a prior art reference disclosing two pivotal handle members and an ear piercing pin or bar member.

The foregoing inventions are suitable for their intended purposes. However, one disadvantage to many prior art references is that cross contamination between livestock can occur when the ear tool applicator touches any portion of the animal's ear which has been pierced or cut by the applicator. Such cross contamination can result in unnecessarily diseased livestock which, in turn, can result in expensive and extensive treatment. Accordingly, one objective of the invention disclosed herein is to provide a means by which an ear tag can be installed minimizing cross contamination between animals. It is another objective to provide an ear tag tool or installer which quickly and efficiently installs ear tags. It is yet another objective to provide the ear tag installation elements on either a separate installation tool or on structure attached to the ear tag. It is yet another objective of this invention to provide a method of installation whereby the ear tag is efficiently secured to the animal's ear by taking advantage of a resilient or spring-like feature of a neck portion of the tag or installer and activated by a slotted inserting member.

DISCLOSURE OF THE INVENTION

In accordance with the present invention, apparatuses and methods of installing ear tags are provided. In one embodiment, a pair of pivotal handle members are used in conjunction with a disposable inserting member which is attached to a pivoting head on one of the handle members. The inserting member includes a cutting element or tip which pierces the ear. A tab portion or locking member of the ear tag is removably connected to the inserting member. The distal ends of the handle members are placed around the animal's ear and are closed upon one another causing the inserting member to be inserted through the ear along with the tab portion or locking member of the ear tag. The resilient configuration of a neck portion of the tag attached to the tab portion causes the locking member to be easily stripped away from the inserting member once the inserting member clears the ear. The inserting member then falls away from the animal's ear leaving the ear tag securely fastened to the animal's ear by the locking member.

In another embodiment, the ear tag installation tool simply comprises a handle member having a distal end for which to removably attach an inserting member. Use of the second embodiment is similar to the first embodiment in that the inserting member is inserted through the ear with the tab portion or locking member of the tag attached thereto. However, in the second embodiment, the ear of the animal is stabilized by simply grasping it with a free hand while the inserting member is inserted through the ear. The same stripping action as discussed above applies to this embodiment resulting in easy installation of the ear tag.

In yet another embodiment, an ear tag installer is provided which incorporates the inserting member and cutting tip directly on structure attached to the neck portion of the ear tag. Additionally, the tab portion or locking member of the ear tag used in the previous embodiments is the inserting member. The installer of this embodiment may also be defined as including the neck portion and similar structure found on either the first or second embodiment which forces the inserting member through the ear. The installer of the third embodiment can be modified by providing the inserting member with either a female or male end.

Other advantages of this invention will become apparent from a review of the following description taken in conjunction with the accompanying drawings.

BRIEF DESCRIPTION OF THE DRAWINGS

FIG. 1A is a perspective view of one preferred embodiment of the ear installation tool of this invention;

FIG. 1B is an enlarged fragmentary perspective exploded view of the tool of FIG. 1A and an inserting member adapted to removably connect to one of the handle members;

FIG. 1C is another enlarged fragmentary perspective exploded view similar to FIG. 1B illustrating another type of inserting member that may be used in conjunction with the installation tool;

FIG. 2 is a fragmentary perspective exploded view of another embodiment of the ear installation tool of this invention illustrating its use with either of the inserting members illustrated in FIGS. 1B and 1C, and one type of ear tag which may used with the inserting members;

FIG. 3 is an enlarged fragmentary vertical section taken along line 3—3 of FIG. 1B illustrating installation of the ear tag;

FIGS. 4–7 are additional enlarged fragmentary vertical sections sequentially illustrating the installation of the ear tag;

FIG. 8 is a perspective view of another form of the invention defined as an installer wherein the inserting member with cutting tip is directly attached to the neck portion of the ear tag;

FIGS. 9–12 sequentially illustrate the installation of an ear tag by the installer of FIG. 8;

FIG. 13 is a fragmentary vertical section taken along line 9—9 of FIG. 8 illustrating one modification of the installer; and FIG. 14 is another fragmentary vertical section as in FIG. 13 illustrating another modification of the installer of FIG. 8.

BEST MODE FOR CARRYING OUT THE INVENTION

An ear installation tool according to a first embodiment of this invention is illustrated in FIGS. 1A–1C. As shown, an ear tag installation tool 10 of the first embodiment is characterized by a first handle member 12 pivotally connected to a second handle member 14 by pin 16. Members 12 and 14 resemble a pair of scissors offset which can be moved between an open and closed position. The distal end 18 of the first handle member 12 includes a pivotal head 22 which is mounted to distal end 18 by pin 24. Head 22 has a groove 23 which is adapted to receive distal end 18 and which enables the head 22 to be pivoted or rotated about pin 24. The free end of head 22 has a smaller diameter portion shown as extension 26 and when placed in the position of FIG. 1A, extension 26 points toward the distal end 20 of second handle member 14. Preferably, a shoulder 25 is formed adjacent the extension 26, the shoulder serving a function as further outlined below. A base plate 27 is attached to the distal end 20 of the second handle member 14. Base plate 27 includes a receiving gap 29 which receives an inserting member 30 or 40 during the installation of an ear tag. The lower or bottom portion of receiving gap 29 defines a stop 28. The purpose of the inserting member is to secure a portion of the ear tag while the inserting member is forced through the tissue of the animal's ear. As shown in FIG. 1B, inserting member 30 is a tubular or cylindrical shaped structure having a body portion or side surface 32, a cutting tip or cutting element 34 formed at one end of the body portion, and an opening 33 formed at the other end of the body portion 30. An ear tag slot 36 is formed parallel to axis x-x of the inserting member 30 and in the side surface or body portion 32 thereof, the slot 36 being of a specified width which may receive the tab portion of an ear tag as further explained with reference to FIG. 2 below. Slot 36 may be described as having a distal end 37 which is adjacent to cutting tip 34, while the other end of slot 36 may include a neck receiving opening 38 whose width is adapted to receive the neck portion of an ear tag. One or more protrusions 39 define a point of separation between slot 36 and opening 38. Protrusions 39 delimit a narrower opening in body portion 32 that is contiguous with slot 36 and opening 38. When inserting member 30 is used to penetrate the ear of an animal, cutting tip 34 causes a circular shaped portion of the ear to be removed. This circular shaped tissue is often referred to as a "slug."

FIG. 1C illustrates the use of the installation tool 10 with modified inserting member 40. Inserting member 40 is also characterized by a tubular or cylindrical shaped body portion 41 which has a cutting tip 42 formed at one end, and an opening 43 formed at the other end. Cutting tip 42 creates a semi-circular shaped cut in the animal's ear. Body portion 41 further includes a tag slot 44 which may extend continuously toward the cutting tip 42. The other end of the tag slot 44 may include a neck receiving opening 46 and protrusions 47 in the same arrangement as neck receiving opening 38 and protrusions 39 of inserting member 30. During the installation of an ear tag by penetration of inserting members 30 or 40 through the ear of an animal, the inserting member is first aligned with receiving gap 29. After the cutting tip of the inserting member has penetrated the ear, the inserting member is urged to rotate away from the base plate 27. This rotation angle A is illustrated in FIGS. 1B and 1C. The degree to which the inserting member rotates can be controlled by adjusting the lengths of distal ends 18 and 20. For example, distal end 18 can be shortened such that when the handle members are moved to a closed position, stop 28 prevents the inserting member from rotating at an angle opposite angle A. Alternatively, distal end 20 or base plate 27 can be lengthened with respect to distal end 18 so that the closing action of the handle members naturally cause the rotation of the inserting member. This rotation of the inserting member provides an increased capability for the tab portion of the ear tag to be separated from the inserting member as it is inserted through the animal's ear. Consequently, the insertion process is made more efficient.

FIG. 2 illustrates a second embodiment of the ear tag installation tool of this invention. For this embodiment, in lieu of a pair of handle members, the ear installation tool 50 may simply resemble a screw driver or punch type tool including a handle 52, a rod 54 extending from the handle 52, and an engaging portion 56 extending from rod 54. Engaging portion 56 is inserted within the opening 33/43 of the inserting member of choice. Also shown in FIG. 2 is one example of an ear tag which may be installed in the ear E of an animal by use of tools 10 or 50. The ear tag 100 has a curved neck portion 102 made of a resilient material which has a tendency to keep its curved shape. This curved shape defines a normal position for the neck portion. A tab portion or locking member 104 is connected to one end of the curved neck portion 102 while the panel 106 of the ear tag connects to the other end of the curved neck portion 102. Indicia 107 may be placed on the panel 106 in order to identify the animal. The tab portion or locking member 104 is inserted within the tag slot of the inserting member. The length of tab portion 104 is approximately the same or slightly exceeds the length of the tag slot of the inserting member.

The installation of the ear tag 100 by tool 10 will now be explained with reference to FIGS. 3–7. As illustrated in FIG. 3, the handle members 12 and 14 are placed on opposite sides of the ear. Tab portion 104 is inserted within tag slot 36 of inserting member 30. Extension 26 of head 22 is then inserted within opening 33 of inserting member 30 which places inserting member 30 in a position to penetrate the ear. Shoulder 25 limits the extent to which extension 26 can be inserted within opening 33. The handle members are squeezed together first causing cutting tip 34 to penetrate the ear and to form opening O therein. As the handle members continue to be moved to the closed position, the inserting member continues its travel through the ear and neck portion 102 of the ear tag begins to make contact with the tissue of the ear surrounding opening O. This contact between the neck portion 102 and the ear causes the neck portion to be rotated approximately 90° from its normal position and substantially in a direction parallel with axis x—x. This deformation of the neck portion 102 causes the distal end 105 of tab portion 104 to rotate out of the tag slot 36 near the distal end 37. This rotation can be thought of as a stripping of the tab portion away from the inserting member. The proximal end 109 of the tab portion 104 becomes wedged against the interior surface 35 of inserting member 30 which further results in the distal end 105 to continue moving away from the tag slot as the inserting member further penetrates the ear. When the handle members reach the position illustrated in FIG. 5, the tab portion 104 has completely cleared the slot 36. As illustrated in FIG. 6, the handle members can then be moved to the open position which causes the inserting member 30 to fall away from the ear. Specifically, contact of the curved neck portion 102 against the inserting member 30 as the handle members are moved to the open position allows the extension 26 to be easily removed from within opening 33, and once extension 26 clears opening 33, inserting member 30 falls clear. Because of the size of the opening O, extension 26 does not make contact with the opening O, thus preventing contamination between animals. In order to ensure that no contact is made between extension 26 and the opening O, extension 26 can be made of a much smaller diameter than illustrated which gives the extension 26 a greater clearance between it and the opening O. Accordingly, opening 33 can also be modified to properly mate with a smaller diameter extension 26.

It is desirable to have at least some gap or space between the proximal end 109 of tab portion 104 and the tip of extension 26 so that the distal end 105 of the tab portion 104 does not become caught against the distal end 37 of the tag slot by pressure induced on the tab portion 104 by the extension 26. If the continuous tag slot 44 is used, it is still important to have some separation between extension 26 and proximal end 109 so that the extension 26 does not inadvertently influence the rotation of the tab portion 104 out of the tag slot.

FIG. 7 shows the inserting member 30 falling completely clear of the ear E as the handle members have been further moved to the open position. Also, the neck portion 102 is no longer constrained within or against the inserting member 30 which allows the neck portion to return to its undeformed or normal position.

The ear installation tool 50 may be used to install an ear tag in the same manner as described above with reference to ear installation tool 10. The only significant difference in the method of installing an ear tag by use of the installation 50 is that a free hand of the user is used to stabilize the ear E as the inserting member is pushed through the ear. The same stripping action described above is achieved with respect to the tab portion of the ear tag and the inserting member. The inserting member 30 and the extension 26 can be coated with an appropriate antibiotic material which further reduces the chances of transmitted infections between animals. Additionally, the tag itself can be coated with an antibiotic material along the neck portion 102 and tab portion 104 to help prevent such contamination.

According to another embodiment of this invention, the installer has some of its elements mounted directly to the ear tag and further includes a driving tool to assist in the placement of the ear tag. As shown in FIG. 8, the ear tag installer 110 includes neck portion 112 which connects at one end to inserting member 114, and connects at its other end to tag 200. Neck portion 112 extends along a plane which extends in the direction of axis y—y is substantially perpendicular to axis x—x. Thus, in this embodiment of the invention, the ear tag 200 is solely defined as the same structure found in the panel 106 of tag 100, while the neck portion 112 and inserting member 114, although attached to the ear tag 200 are considered part of the installer 110. Inserting member 114 simply replaces the tab portion or locking member 104 of tag 100 and results in the inserting member 114 being permanently attached to the animal's ear after installation of the ear tag. The ear tag installer further includes a driving tool 60 having a driving tip 61 which engages with the well 119 of inserting member 114. Driving tool 60 can take the form of tool 50 or tool 10 or any other tool which can push the inserting member 114 through the ear. Inserting member 114 is structurally similar to inserting member 30. Specifically, one end of inserting member 114 includes a cutting tip 117 while the other end of the inserting member 114 has well 119 which receives driving tip 61. As further shown in FIGS. 9 and 10, the cutting tip 117 may be held within a cutting tip holder 118 which attaches to inserting member 114. Thus, various types of cutting tips 117 can be installed with the same inserting member.

FIGS. 9–12 illustrate the method by which the inserting tool 60 pushes the inserting member 114 through the ear. FIG. 9 shows the inserting member penetrating the ear, FIG. 10 illustrates the deformation of neck 112, and FIG. 11 illustrates the neck portion beginning to return to its undeformed or normal position. The deformation of the neck portion 112 occurs in the same way as previously described with respect to the first and second embodiments. FIG. 12 shows neck portion 112 in its normal position causing the inserting member 114 to extend transversely with respect to opening O. The return of the neck portion to the normal or undeformed position ensures that the inserting member 114 cannot pass back through opening O and which results in the ear tag being securely fastened to the animal's ear. The resiliency or spring action of the neck portion causes it to snap back to its normal position as soon as the inserting member 114 clears the ear.

FIG. 13 is an alternative embodiment of an ear tag installer illustrated as installer 120. Installer 120 is similar to installer 110. Installer 120 includes an inserting member 124 which penetrates the ear of an animal by means of a cutting tip 127 retained in a cutting tip holder 128 attached to one end of the inserting member 124. A neck portion 122 extends in a perpendicular fashion away from the longitudinal axis of the inserting member 124. A central opening 125 is formed completely through the inserting member 124. A shaft 129 attaches to the cutting tip holder 128 and extends through opening 125 and protrudes outwardly from the opening 125. An alternate driving tool 60' is designed to engage with the protruding end of shaft 129, driving tool 60' having a distal end with a well or recess 64 formed therein. The installer of FIG. 13 functions in the same manner as the installer of 110, the only significant difference being that the driving tool 60' has a female-type end as opposed as a male-type end.

FIG. 14 is yet another alternative ear tag installer shown in the form of installer 130 which is also similar to installer 110. Specifically, installer 130 includes an inserting member 134 having a cutting tip 137 and cutting holder 138 positioned at one end, and one or more contiguous wells or openings 133 and 135 formed at the other end. As with the previous embodiments, neck 132 extends perpendicularly away from the longitudinal axis of the inserting member 134. According to this arrangement, installer 130 is adapted to use driving tool 60. When the driving tip 61 of tool 60 is engaged with the inserting member 134, the tool 60 is further enclosed within additional well or opening 135 defined by cylindrical extension or flange 136 which extends from the proximal end of member 134. One advantage of using an installer according to FIG. 14 is that the driving tool 50 is further shielded from contact with the animal's ear which further prevents contamination between animals.

Although FIGS. 8–14 illustrate structure which has been described as an ear tag installer combination, the combination of the inserting member attached directly to the neck portion can also be defined simply as a modified ear tag with integral installation capability. Therefore, it will be understood that the installer structure directly attached to the ear tag in FIG. 8 constitutes a separate embodiment.

In the embodiments discussed above, the portion of the ear installation tool or driving tool which pushes the inserting member through the ear can also be defined as an engaging member. Additionally, the neck portions 102, 112, 122 or 132 can be alternately defined as resilient members.

This invention has been described in detail with reference to particular embodiments thereof, but it will be understood that various other modifications can be effected within the spirit and scope of this invention.

What is claimed is:

1. An ear tag tool for installing an ear tag on an ear of an animal, said tool comprising:

a pair of handle members each having distal ends, said handle members being pivotally connected and movable between an open position and a closed position;

a head pivotally connected to one of said handle members at said distal end thereof;

a base attached to the other of said handle members at said distal end thereof;

an inserting member removably connected to said head, said inserting member including a slot formed thereon for receiving a portion of the ear tag;

wherein the tag is installed on the ear by inserting the portion of the tag in said slot, positioning the ear between said handle members while in the open position, moving said handle members to the closed position resulting in said inserting member being inserted through the ear along with the portion of the ear tag, said inserting member being released from said head after insertion through the ear.

2. A tool, as claimed in claim 1, further including:

an extension attached to said head; and said inserting member further includes an opening to receive said extension, said inserting member being released from said extension after said inserting member is inserted through the ear.

3. A tool, as claimed in claim 1, where said base further includes:

a gap formed thereon and substantially conforming in size to said inserting member enabling said inserting member to pass through said gap as said handle members are moved to the closed position.

4. A tool, as claimed in claim 3, wherein said base further includes:

a stop defining a portion of said gap and causing said inserting member to travel at an angle directed distally from said distal ends and preventing said inserting member from traveling at an angle directed proximally from said distal ends.

5. A tool, as claimed in claim 1, wherein said inserting member further includes:

a cutting tip formed thereon.

6. A tool, as claimed in claim 5, wherein:

said cutting tip includes a plurality of cutting points.

7. A tool, as claimed in claim 5, wherein:

said cutting tip includes a single pointed end.

8. A tool, as claimed in claim 1, wherein:

said slot extends parallel to a longitudinal axis of said inserting member.

9. A tool, as claimed in claim 1, wherein said inserting member further includes:

a neck receiving opening contiguous with said slot; and at least one protrusion on said inserting member defining a narrower portion of said slot and positioned adjacent to said neck receiving opening.

10. An ear tag tool for installing an ear tag on an ear of an animal, said tool comprising:

a pair of handle members pivotally connected and movable between an open position and a closed position;

means connected to said distal end of one of said pair of handles for pivoting;

means removably connected to said pivoting means for inserting a portion of the ear tag through the ear of the animal, said inserting means having a slot formed thereon for receiving the portion of the ear tag, said inserting means including means for releasing said inserting means from said pivoting means after said inserting means is inserted in the ear;

means connected to the other of said pair of handle members for receiving said inserting means as said pair of handle members are moved to the closed position.

11. A tool, as claimed in claim 10, wherein said releasing means includes:

an opening formed on said inserting means; and an extension connected to said pivoting means and removably inserted through said opening.

12. A tool, as claimed in claim 10, wherein said inserting means further includes:

a neck receiving opening contiguous with said slot; and at least one protrusion on said inserting means defining a narrower portion of said slot and positioned adjacent to said neck receiving opening.

13. A method of installing an ear tag onto an ear of an animal, said method comprising the steps of:

attaching an inserting member to a pair of handle members movable between an open position and a closed position;

connecting a portion of the ear tag to the inserting member;

positioning the handle members in the open position and surrounding the ear;

moving the handle members to the closed position;

inserting the inserting member through an opening cut through the ear as the handle members move to the closed position;

stripping the portion of the ear tag away from the inserting member as the inserting member is inserted through the ear and after the portion of the ear tag passes through the opening; and releasing the inserting member from the handle members.

14. A method, as claimed in claim 13, further comprising the step of:

attaching another inserting member to the handle members for installing another ear tag.

15. A method, as claimed in claim 13, further including the step of:

coating the inserting member with a therapeutic material prior to inserting the inserting member through the ear.

16. A method, as claimed in claim 13, wherein said moving step further includes the step of:

moving the inserting member at an angle directed distally from the handle members.

17. An ear tag tool for intalling an ear tag on an ear of an animal, said tool comprising:

a handle member including a proximal end for grasping, and a distal end including a larger diameter rod and a smaller diameter engaging portion extending from said rod; and an inserting member removably connected to said distal end of said handle member, said inserting member including a slot formed thereon for receiving a portion of the ear tag, said inserting member further including a cutting tip having a plurality of cutting points for penetrating the ear to form an opening for passing the inserting member and the portion of the tag through the ear.

18. A method of installing an ear tag onto an ear of an animal, said method comprising the steps of:

providing a handle member having a distal end;

attaching an inserting member to the distal end;

securing a portion of the ear tag to the inserting member;

inserting the inserting member with the portion of the ear tag secured thereto through an opening formed in the ear by passing the inserting member through the ear;

stripping the portion of the ear tag secured to the inserting member away from the inserting member after the portion of the ear passes through the opening;

separating the inserting member from the handle member; and replacing the separated inserting member with another inserting member for installation of another ear tag.

19. An ear tag installer for installing an ear tag to an ear of an animal in combination with an ear tag, said combination comprising:

an inserting member extending along an axis, said inserting member including a first end having a cutting tip to pierce the ear, and a second end having an opening;

a curved neck portion having a proximal end and a distal end, said distal end attached to said inserting member between said first and second ends thereof and remote from said opening, and said proximal end attached to the ear tag, said curved neck portion extending transversely to said axis prior to installing the ear tag;

an engaging member having a distal end for engagement with said inserting member along said axis of said inserting member;

wherein the ear tag is installed by piercing the ear with said cutting tip to form an opening through the ear and inserting said inserting member through the opening in the ear along said axis by force applied to said engaging member, the insertion resulting in said distal end of said curved neck portion being positioned on one side of the ear and said proximal end of said curved neck portion being positioned on the other side of the ear, said engaging member being released from said inserting member after the insertion of said inserting member through the ear.

20. The combination of, as claimed in claim 19, wherein said inserting member further includes:

a well formed at said second end thereof for receiving said engaging member therein.

21. The combination of, as claimed in claim 19, wherein said inserting member further includes:

a flange formed at said second end thereof and surrounding said engaging member when said engaging member is engaged with said inserting member to prevent it from making contact with the ear during insertion.

22. The combination of, as claimed in claim 19, wherein said inserting member is substantially cylindrical in shape.

23. The combination of, as claimed in claim 19, wherein: said curved neck portion is resilient.

24. The combination of, as claimed in claim 19, wherein: said opening is formed along said first axis and completely through said inserting member; and said combination further including a shaft inserted through said central opening and attached at said first end of said inserting member to said cutting tip, said shaft extending beyond said second end of said inserting member.

25. The combination of, as claimed in claim 24, wherein said engaging member further includes:

a well formed on the distal end thereof for receiving said shaft.

26. An ear tag installer for installing an ear tag to an ear of an animal, said installer comprising:

an inserting member having first and second ends and extending along an axis, said inserting member having an opening formed in said second end thereof and further including means for cutting the ear at said first and thereof;

resilient means for interconnecting said inserting member to the tag, said resilient interconnecting means connected between said first and second ends of said inserting member and remote from said opening and extending transversely to said axis prior to installing the ear tag;

means for releasably engaging said inserting member along said axis to force said inserting member through the ear;

wherein the tag is installed by inserting said engaging means in said opening of said inserting member and forcing said inserting member through the ear resulting in said resilient interconnecting means being positioned on both sides of the ear, said engaging means being released from said inserting member after forcing said inserting member through the ear.

27. An installer, as claimed in claim 26, wherein said resilient interconnecting means has a curved shape.

28. An installer, as claimed in claim 26, wherein said inserting member further includes:

a flange formed at said second end thereof and surrounding said engaging means when said engaging means is engaged with said inserting member to prevent it from making contact with the ear during insertion.

29. An installer, as claimed in claim 26, wherein:

said inserting member is substantially cylindrical in shape.

30. A modified ear tag for installation onto an ear of an animal, said modified ear tag comprising:

an inserting member extending along an axis, said inserting member including a first end having a cutting tip to pierce the ear of the animal, and a second end having an opening;

a curved neck portion having a proximal end and a distal end said distal end attached to said inserting member intermediate said first and second ends thereof and remote from said opening, said curved neck portion extending transversely to said axis at both said proximal and distal ends prior to installing the ear tag; and a panel connected to said proximal end of said curved neck portion.

31. An ear tag, as claimed in claim 30, wherein said inserting member further includes:

a flange formed at an end opposite said cutting tip.

32. An ear tag, as claimed in claim 30, wherein:

said curved neck portion is resilient.

33. Apparatus for installing an ear tag of the type having an elongated neck with a first end connected to a panel, and a second end connected to a locking member extending transversely to the neck and inserted through the ear of an animal, said apparatus comprising:

a generally cylindrical inserting member having a side surface, a first end and a second end;

a cutting element at said first end of said cylindrical inserting member for cutting an opening in the ear for passage of said cylindrical inserting member;

a slot formed on said side surface of said cylindrical inserting member for receiving the locking member so that the second end of the elongated neck connected to the locking member is passed through the opening in the ear while said locking member is retained in said cylindrical inserting member as it passes through the opening in the ear; and means on said second end of said cylindrical inserting member for releasable engagement by a tool for forcing said cutting element and said cylindrical inserting member through the ear.

34. A method of installing an ear tag of the type having an elongated neck with a first end connected to a panel and a second end connected to a locking member extending transversely to the neck for insertion through the ear of an animal, said method comprising:

proviḍing a generally cylindrical inserting member having a cutting end, a tool receiving end, and a side surface including a slot;

inserting the locking member in the slot;

engaging the tool receiving end with a tool for forcing the cutting end of cylindrical inserting member through the ear to form an opening;

forcing the cutting end of the cylindrical inserting member through the are with the tool;

passing the cylindrical inserting member and the second end of the neck connected to the locking member through the opening; and releasing the tool from the tool receiving end of the cylindrical inserting member so that the inserting member becomes separated from the tool.

35. An ear tag installer for installing an ear tag to an ear of an animal, said installer comprising:

an inserting member having a first end and a second end, and extending along an axis, said inserting member having a central opening formed along said axis and through said inserting member;

a cutting tip positioned at said first end of said inserting member;

a shaft inserted through said central opening and attached at said first end of said inserting member to said cutting tip, said shaft extending beyond said second end of said inserting member;

resilient means for interconnecting said inserting member to the tag, said resilient interconnecting means extending transversely to said axis prior to installing the ear tag; and means for releasably engaging said shaft along said axis of said inserting member in order to force said inserting member through the ear.

36. An installer, as claimed in claim 35, wherein said engaging means further includes;

a well for receiving said shaft.

37. An ear tag tool for installing an ear tag on an ear of an animal, said tool comprising:

a handle member including a proximal end for grasping, and a distal end including a larger diameter rod and a smaller diameter engaging portion extending from said rod;

an inserting member removably connected to said distal end of said handle member, said inserting member including a slot formed thereon for receiving a portion of the ear tag, said inserting member further including a cutting tip for penetrating the ear to form an opening for passing the inserting member and the portion of the tag through the ear;

a neck receiving opening contiguous with said slot; and at least one protrusion formed on said inserting member defining a narrower portion of said slot and positioned adjacent to said neck receiving opening.

* * * * *